（12） United States Patent
Mosko (10) Patent No.: US 10,187,460 B2
(45) Date of Patent: *Jan. 22, 2019

(54) PEER-TO-PEER SHARING IN A CONTENT CENTRIC NETWORK (71) Applicant: CISCO TECHNOLOGY, INC., San Jose, CA (US)

(72) Inventor: Marc E. Mosko, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,861

(22) Filed: Mar. 19, 2017

(65) Prior Publication Data

US 2017/0214739 A1 Jul. 27, 2017

Related U.S. Application Data (63) Continuation of application No. 14/595,123, filed on Jan. 12, 2015, now Pat. No. 9,602,596.

(51) Int. Cl.
G06F 15/16 (2006.01)
H04L 29/08 (2006.01)
H04L 12/755 (2013.01)
H04L 29/12 (2006.01)

(52) U.S. Cl.
CPC .......... *H04L 67/104* (2013.01); *H04L 45/021* (2013.01); *H04L 61/305* (2013.01); *H04L 67/06* (2013.01); *H04L 67/1063* (2013.01); *H04L 67/1074* (2013.01); *H04L 67/327* (2013.01)

(58) Field of Classification Search
CPC . H04L 67/1074; H04L 67/327; H04L 61/305; H04L 45/021
USPC ......................................................... 709/217
See application file for complete search history.

(56) References Cited

U.S. PATENT DOCUMENTS

2016/0019275 A1* 1/2016 Mosko .............. G06F 17/30575
707/610
2016/0205034 A1* 7/2016 Solis ....................... H04L 45/04
709/226

* cited by examiner

*Primary Examiner* — Frantz B Jean (57) ABSTRACT

The system receives a list of one or more name prefixes associated with an original name, wherein the original name corresponds to an original root manifest that indicates a set of original content objects and includes a set of content object hash (COH) values for the indicated set of original content objects, and wherein the original root manifest is registered with a tracking service. Based on a name prefix from the list, the system receives the original root manifest and selects a peer node that stores one or more of the original content objects. The system determines which original content objects are stored at the selected peer node and generates an interest for an original content object, wherein the name for the interest includes the name prefix, and wherein the third interest includes a COH value for an original content object stored at the selected peer node.

20 Claims, 10 Drawing Sheets

PEER-TO-PEER SHARING IN A CONTENT CENTRIC NETWORK

RELATED APPLICATION

This Application is a continuation application (and claims the benefit of priority under 35 U.S.C. § 120) of U.S. application Ser. No. 14/595,123, now U.S. Pat. No. 9,602, 596, entitled "PEER-TO-PEER SHARING IN A CONTENT CENTRIC NETWORK" filed on Jan. 12, 2015, Inventor Marc E. Mosko. The disclosure of that prior application is considered part of the disclosure of this application and is incorporated by reference in its entirety.

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. patent application Ser. No. 14/334,509, entitled "DIFFERENCE BASED CONTENT NETWORKING," by inventor Marc E. Mosko, filed 17 Jul. 2014 (hereinafter "U.S. patent application Ser. No. 14/334,509");

U.S. patent application Ser. No. 14/337,026, entitled "SYSTEM FOR DISTRIBUTING NAMELESS OBJECTS USING SELF-CERTIFYING NAMES," by inventor Marc E. Mosko, filed 21 Jul. 2014 (hereinafter "U.S. patent application Ser. No. 14/337,026"); and U.S. patent application Ser. No. 14/475,416, entitled "SYSTEM AND METHOD FOR RELIABLE CONTENT EXCHANGE OF A CCN PIPELINE STREAM," by inventor Marc E. Mosko, filed 2 Sep. 2014 (hereinafter "U.S. patent application Ser. No. 14/475,416");

the disclosures of which are herein incorporated by reference in their entirety

BACKGROUND

Field

This disclosure is generally related to a content centric network (CCN). More specifically, this disclosure is related to distributing content using a tracking service based on nameless content objects for peer-to-peer sharing in a CCN.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level.

In CCN, an interest is forwarded towards a CCN node that advertises at least a prefix of the interest's name. If this CCN node can provide the content object, this node can return the content object to satisfy the interest. A publisher can publish original content under a certain name and can satisfy an interest with a name that includes the routable prefix of the publisher. A first consumer can download the original content from the publisher based on the publisher's routable prefix. The first consumer may want to become a "seeder" and serve as a node from which a second consumer can obtain the original content. However, the first consumer can only fulfill interests that include its routable prefix. In order to become a seeder, the first consumer may need to rename the content (which contains the routable prefix of the original publisher) to include the routable prefix of the first consumer. Neighboring CCN nodes may need to update their forwarding tables to include entries for each name prefix associated with the content stored by the first consumer. These processes can decrease the efficiency of network operations.

SUMMARY

One embodiment provides a system that facilitates peer-to-peer sharing of content in a CCN based on nameless content objects. During operation, the system receives, by a content consuming device, in response to a first interest for a piece of content based on an original name, a first content object that includes a list of one or more name prefixes associated with the original name, wherein a name is a hierarchically structured variable length identifier (HSVLI) which comprises contiguous name components ordered from a most general level to a most specific level, wherein the original name corresponds to an original root manifest that indicates a set of original content objects and includes a set of content object hash (COH) values for the indicated set of original content objects, and wherein the original root manifest is registered with a tracking service. In response to a second interest based on a name prefix from the list, the content consuming device receives a second content object that is the original root manifest. The system selects a peer node based on the name prefix, wherein the peer node stores one or more of the original content objects. The system determines which original content objects are stored at the selected peer node. The system generates a third interest for a respective content object of the original content objects, wherein the name for the third interest includes the name prefix used to select the peer node, and wherein the third interest includes a COH value for a determined original content object stored at the selected peer node.

In some embodiments, the system determines which original objects are stored at the selected peer node by generating a request for an index value from the selected peer node, wherein the request includes a first current index value of a last known peer node. Based on the request, the content consuming device receives a response that indicates a second current index value of the selected peer node, wherein the second current index value indicates which original content objects are stored at the selected peer node.

In some embodiments, the original root manifest includes metadata information for the content represented by the original manifest, wherein the metadata information can be used by a content consuming device to search for content in a CCN. The metadata information includes one or more of: a title for the content represented by the original root manifest; one or more key words for the content represented by the original root manifest; and a description for the content represented by the original root manifest.

In some embodiments, in response to receiving the original root manifest, the content consuming device creates a new root manifest, wherein the new root manifest indicates the original root manifest and a new name associated with the original name. The content consuming device registers the new root manifest with the tracking service, wherein a new name prefix associated with the new name is added to the list.

In some embodiments, in response to receiving one or more of the original content objects, the content consuming device receives a fourth interest for a respective content object of the original content objects, wherein the name for the fourth interest includes the new name prefix, and wherein the fourth interest includes a COH value for the respective content object.

In some embodiments, the original root manifest includes a signature of an original publisher of the content indicated by the original root manifest, and the new root manifest includes a signature of a user of the content consuming device.

In some embodiments, the system generates a request to remove the new name prefix from the list, wherein the request includes the signature of the user of the content consuming device and a COH value of a manifest for removal.

In some embodiments, the original root manifest includes an additional name to be used as a routable prefix for the content represented by the original root manifest, and the new root manifest includes an additional name to be used as a routable prefix for the content represented by the new root manifest.

In some embodiments, the system receives, by a tracking device, an original root manifest for registration, wherein the original root manifest indicates a set of original content objects and includes a set of content object hash (COH) values for the indicated set of original content objects, wherein the original root manifest further indicates an original name, an original name prefix associated with the original name, and a signature of a publisher of the original root manifest, and wherein a name is a hierarchically structured variable length identifier (HSVLI) which comprises contiguous name components ordered from a most general level to a most specific level. The tracking device verifies the signature of the publisher based on a public key of the publisher. The tracking device adds the original name prefix to a list that indicates one or more name prefixes associated with the original name. The tracking device also generates a content object that indicates the list in response to a request for a content object indicating the one or more name prefixes associated with the original name.

In some embodiments, the tracking device receives a new root manifest for registration, wherein the new root manifest indicates the original root manifest, a new name associated with the original name, and a signature of a publisher of the new root manifest. The tracking device verifies the signature of the publisher of the new root manifest based on a public key of the publisher of the new root manifest. In response to verifying the signature of the publisher of the original root manifest indicated in the new root manifest, the tracking device adds the new name prefix to the list that indicates the one or more name prefixes associated with the original name.

In some embodiments, the tracking device maintains a synchronization protocol with one or more other tracking devices, wherein the tracking device and the one or more other tracking devices share a same anycast address, and wherein any of the synchronized tracking devices can fulfill a request for a content object that indicates the list.

In some embodiments, the tracking device receives the registration request from a content hosting device. The tracking device receives, from the content hosting device, a request to remove a name prefix from the list, wherein the request includes a signature of the content hosting device and a COH value of a manifest for removal. In response to verifying the signature of the content hosting device and in response to determining that the COH value matches a manifest registered with the tracking device, the tracking device removes the name prefix associated with the request from the list.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a content access system that solves the problem of allowing a client to retrieve originally named content from a peer node that stores the content without requiring the peer node to re-name, re-compute, or re-sign the originally named content. To solve this problem, the system provides a tracking service that registers and verifies content created by an original publisher. The content can be represented by a signed manifest that indicates a set of nameless content objects by their content object hash (COH) values. Signing and verifying aggregates of content objects through the use of manifests is described in U.S. patent application Ser. No. 14/231,515, herein incorporated by reference.

In CCN, a client (e.g., a consumer) can obtain content by transmitting an interest for an original publisher's manifest and its constituent content objects with a name that typically includes a routable prefix of the original publisher. The CCN name is used both for routing and to identify a content object. Thus, in order for the consumer to become a "seeder" and allow a subsequent consumer to retrieve its copy of the original content, the consumer may need to re-name the content objects indicated in the manifest, re-hash the content objects to obtain new content object hash (COH) values, and create and re-sign a new manifest. The present system obviates the need for these operations by providing a system in which the consumer (e.g., a downloader of the original content) can efficiently become a seeder by creating only one new content object (e.g., a new manifest that embeds the original publisher manifest) using only one cryptographic signature (e.g., the signature of the consumer). The consumer can register the new manifest with a tracking service, which verifies the new manifest and the embedded original manifest, and adds the consumer's routable name prefix to a list of name prefixes corresponding to nodes that store a registered copy of the original content. Based on the signature verification performed by the tracking service, the original publisher's signature on the original manifest establishes a chain of trust for the original manifest and its constituent content objects, while the consumer's signature does the same for the new manifest. Furthermore, the COH values included in the original manifest provide verification of the integrity of the original content objects.

A subsequent consumer can retrieve the original content from a peer node (e.g., the publisher or any registered seeder) by requesting the list of routable name prefixes from the tracking service and obtaining content based on a routable name prefix from the list and a respective COH. The subsequent consumer can trust the verification previously performed by the tracking service to register each manifest and routable name prefix. Hence, by registering signed manifests of nameless content objects with a tracking service that maintains a list of name prefixes of peer nodes, the system provides an efficient and secure method for peer-to-peer sharing in a CCN.

In examples described in this disclosure, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. The following terms describe elements of a CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across CCN, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

Exemplary Network Environment

Figure 1A:
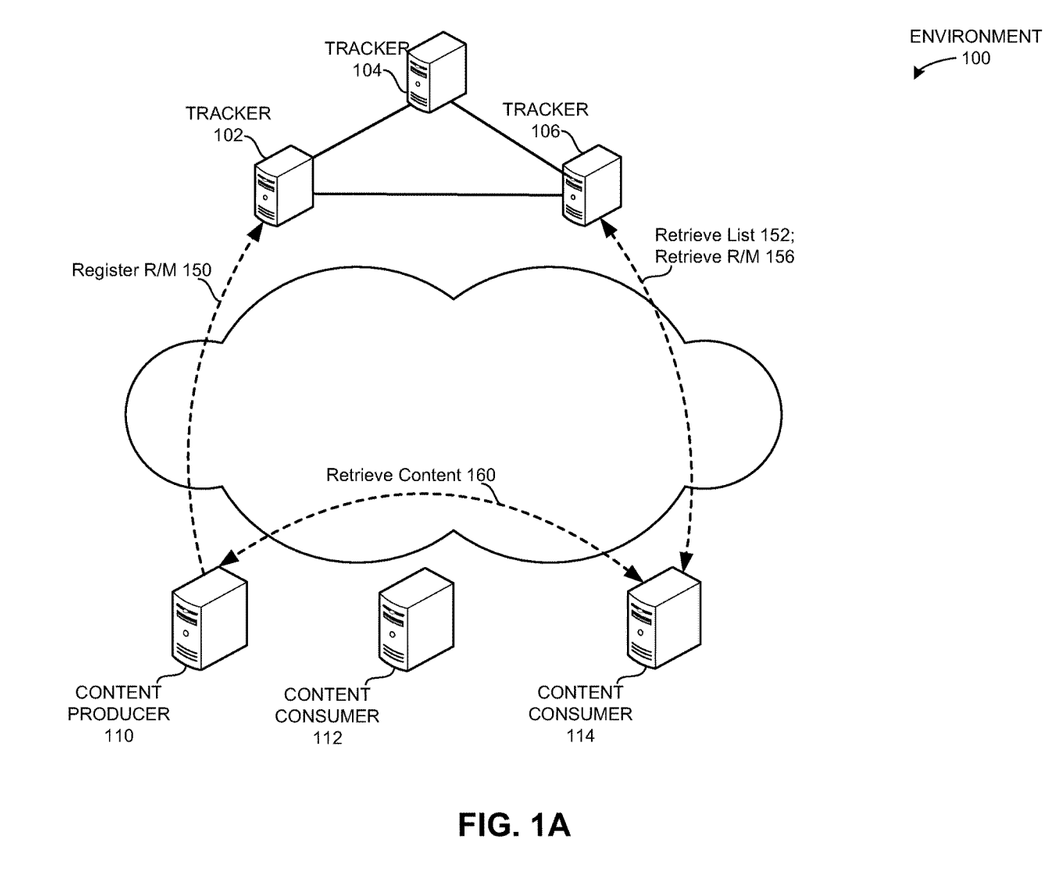
FIG. 1A illustrates an exemplary network environment that facilitates peer-to-peer sharing of content in a CCN, in accordance with an embodiment of the present invention.

FIG. 1A illustrates an exemplary network environment 100 that facilitates peer-to-peer sharing of content in a CCN, in accordance with an embodiment of the present invention. Environment 100 can include trackers 102, 104, and 106 that provide a tracking service and can share a same anycast address. Environment 100 can also include a content producer 110, which can include any content producing device that can publish or produce content and fulfill a request for content via a network 120. Computing environment 100 can also include content consumers 112 and 114, which can include any content consuming device that can determine a request for content via network 102. Network 102 can be, for example, a content-centric network (CCN), a named data network (NDN), or an information-centric network (ICN).

Content producer 110 can create a data collection represented as an original root manifest, which contains an original name, a payload of nameless content objects identified by their content object hash (COH) values, and a signature of the publisher (as described below in relation to FIG. 2B). Manifests and nameless content objects in a replication system are described in U.S. patent application Ser. Nos. 14/337,026 and 14/231,515, which are hereby incorporated by reference. Producer 110 can register the original root manifest with tracker 102 (flow 150), which verifies the signature of producer 110 and adds the routable name prefix of producer 110 to a list of name prefixes for the original content. A consumer (e.g., content consumer 114) who wishes to download the content indicated by the original root manifest retrieves the list of name prefixes, and, upon selecting a name from the list, retrieves the original root manifest from tracker 106 (flows 152 and 156). In this example, the list contains only the routable name prefix for content producer 110. Content consumer 114 then retrieves the content from content producer 110 by transmitting interests based on the name prefix and respective COH values and receiving the corresponding content objects (flow 160).

Figure 1B:
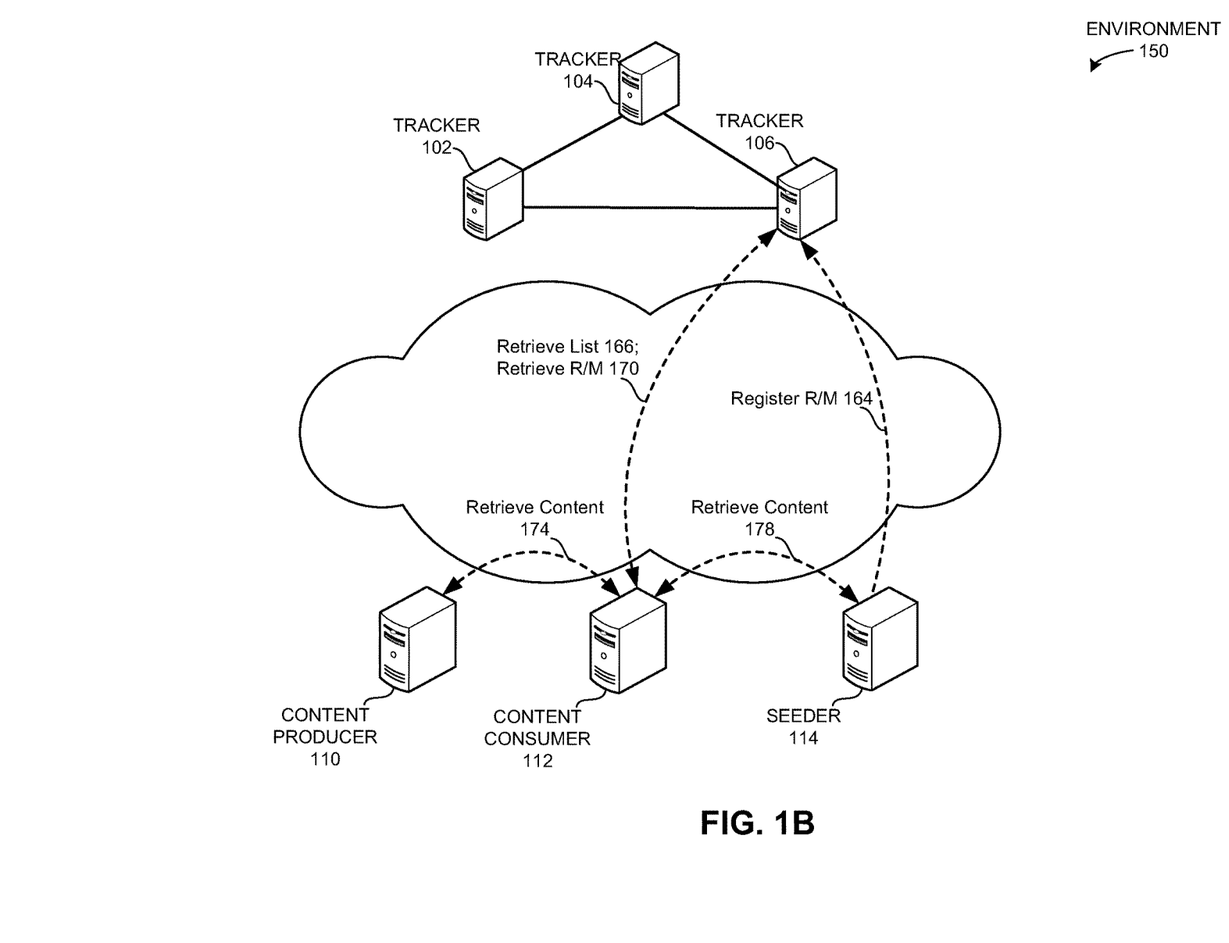
FIG. 1B illustrates an exemplary network environment that facilitates peer-to-peer sharing of content in a CCN, in accordance with an embodiment of the present invention.

FIG. 1B illustrates an exemplary network environment 150 that facilitates peer-to-peer sharing of content in a CCN, in accordance with an embodiment of the present invention. Environment 150 is similar to environment 100 of FIG. 1A, and illustrates how a content consumer can become a seeder, thereby allowing peer-to-peer sharing. Upon retrieving all of the content objects indicated by the root manifest, consumer 114 can become a seeder 114 by encapsulating the original root manifest in a new root manifest, which can include a new name and a signature of the consumer (as described below in relation to FIG. 2C). Seeder 114 registers the new root manifest with tracker 106 (flow 164), which verifies the signature of seeder 114 and adds the routable name prefix of seeder 114 to the list of name prefixes for the original content. Tracker 106 also verifies the signature of the embedded root manifest (e.g., the signature of content producer 110). Any subsequent consumers (e.g., content consumer 112) who wish to retrieve the original content need only retrieve the list and the original root manifest, and can request content based on any of the name prefixes in the list. Tracker 106 can advertise and maintain the list, which includes name prefixes for root manifests registered by peer nodes that have already downloaded the content (e.g., seeder 114).

In addition, a consumer can determine which peer nodes have which content objects, thus allowing the consumer to retrieve content from multiple peers using the appropriate name prefix and COH values. For example, content consumer 112 can obtain the content indicated by the original root manifest by retrieving the list of name prefixes, and, upon selecting a name from the list, retrieving the original root manifest from tracker 106 (flows 166 and 170). At this point, the list contains the routable name prefixes for both content producer 110 and seeder 114. Content consumer 114 can then retrieve content from both content producer 110 and seeder 114 by transmitting interests based on the respective name prefix and COH values and receiving the corresponding content objects (flows 174 and 178). Thus, the system establishes peer-to-peer sharing in a CCN by allowing a consumer to retrieve content based on an original name from any peer node that has already downloaded the content and registered a named and signed root manifest with a tracking service.

Exemplary Content, Original Root Manifest, and New Root Manifest

Figure 2A:
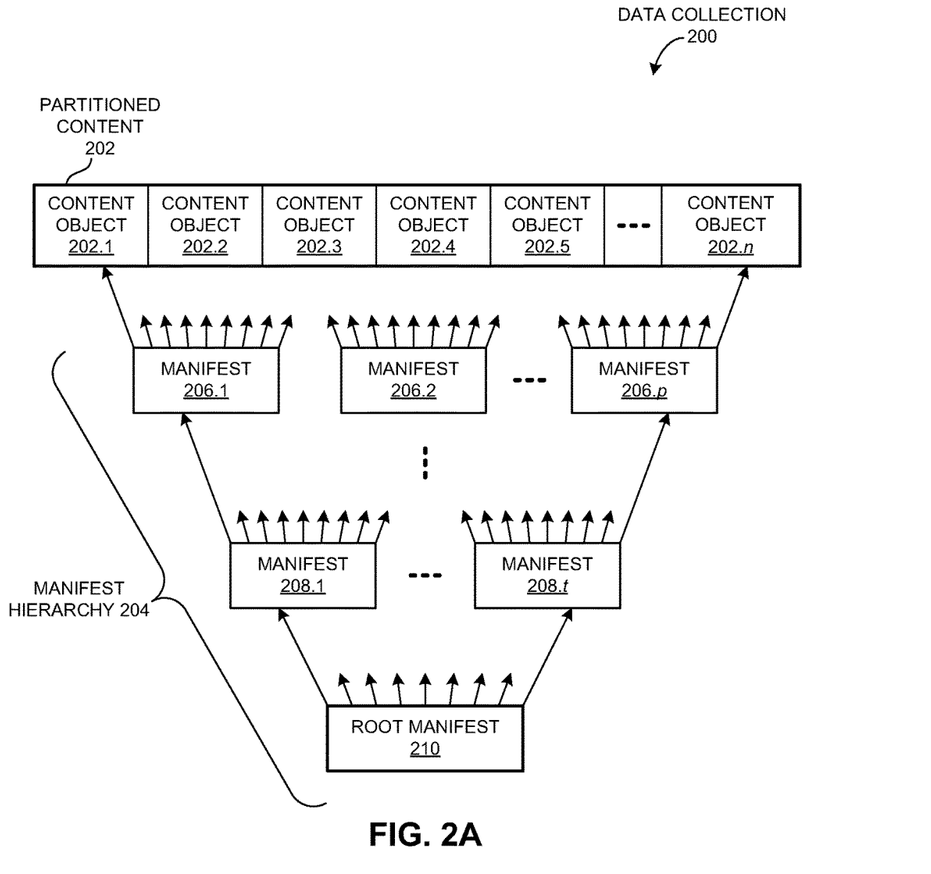
FIG. 2A illustrates an exemplary data collection that includes content which has been partitioned into a plurality of content objects, and a manifest hierarchy for the content objects, in accordance with an embodiment of the present invention.

FIG. 2A illustrates an exemplary data collection 200 that includes content which has been partitioned into a plurality of content objects, and a manifest hierarchy for the content objects, in accordance with an embodiment of the present invention. Specifically, a publisher can partition the data into n nameless content objects 202, and can create a manifest hierarchy 204. Manifest hierarchy 204 can include one or more levels of root manifest, such that lower-level manifests (e.g., the root manifest) reference a next-level manifest (e.g., manifests 208) via its COH value. While manifest hierarchy 204 depicts a complete tree, in practice, manifest hierarchy can include any tree structure that maintains an in-order traversal order. For example, any manifest in manifest hierarchy 204 can include COH values for nameless content objects 202, for other manifests, or for both content objects 202 and other manifests. Also, the individual manifests in manifest hierarchy 204 may each include an arbitrary number of COH values, or alternatively, the publisher may generate all manifests to include an equal number of COH values.

Figure 2B:
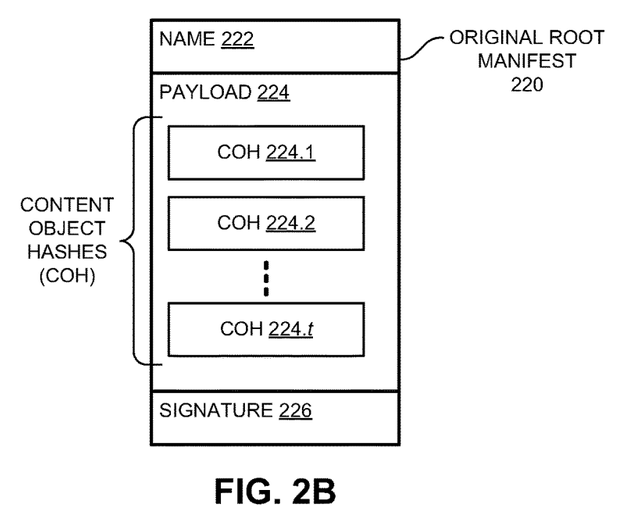
FIG. 2B illustrates an exemplary original root manifest, in accordance with an embodiment of the present invention.

FIG. 2B illustrates an exemplary original root manifest 220, in accordance with an embodiment of the present invention. Original root Manifest 220 can include a name 222, a payload 224, and a signature 226. Name 222 includes a name (or name prefix) for the collection. If the collection was generated by partitioning a large data object, name 222 can include the name for the data object from which the collection was generated. For example, name 222 can be of the format "/publisher/objstore/filehash," where "/publisher" is the routable name prefix to the publisher, "/objstore" is a place to store objects, and "filehash" is the SHA-256 of the entire content object once reconstructed from all the constituent objects.

Signature 226 includes a cryptographic signature, generated based on name 222 and payload 224, and signed using the publisher's digital certificate. Thus, signature 226 creates a security binding between the publisher of the original content, the name of the publisher, and the COH of the original root manifest (e.g., "filehash"). Payload 224 can include a set of content object hash (COH) values 224.1-224.t, which a content consumer, seeder, or other content-hosting service can use to match against a nameless content object's hash value. In some embodiments, payload 224 includes a set of name prefixes (not shown) that can be used to request the nameless objects in the collection from a content-hosting service. The set of name prefixes can also be included in a list that is maintained by a tracking service. Original root manifest 220 can also include keywords or a title or other metadata (not shown) that allow a consumer to perform a search based on the included metadata. Original root manifest 220 can also include an additional name to be used as a routable prefix for the content indicated by original root manifest 220.

Figure 2C:
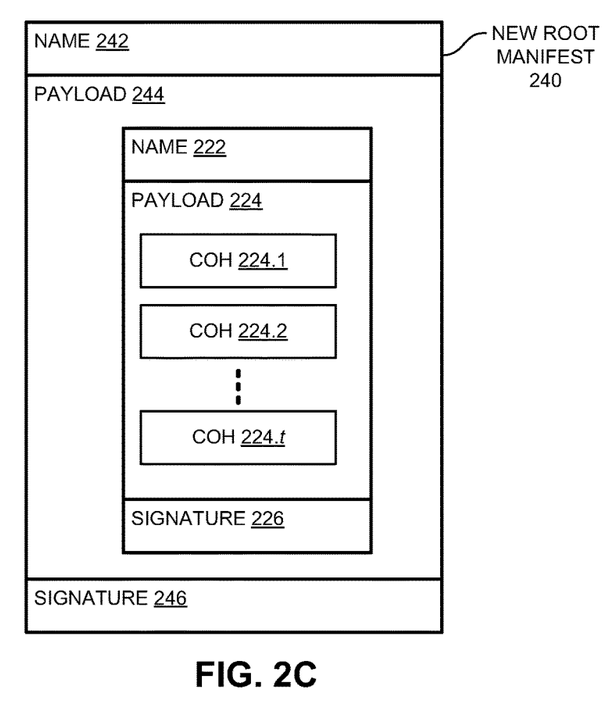
FIG. 2C illustrates an exemplary new root manifest, in accordance with an embodiment of the present invention.

FIG. 2C illustrates an exemplary new root manifest 240, in accordance with an embodiment of the present invention. New root manifest 240 can include a name 242, a payload 244 and a signature 246. Name 242 includes a name (or name prefix) for the collection. Payload 244 indicates an embedding of original root manifest 220, and signature 246 includes a cryptographic signature based on name 242 and payload 244. Name 242 can be included in a list of name prefixes maintained by a tracking service. Name 242 can be of the format "/client /objstore/filehash," where "/client" is the routable name prefix to the client or content consumer, "/objstore" is a place to store objects, and "filehash" is the SHA-256 of the entire content object once reconstructed from all the constituent objects. New root manifest 240 can also include an additional name to be used as a routable prefix for the content indicated by new root manifest 240.

Content Publishers

Figure 3:
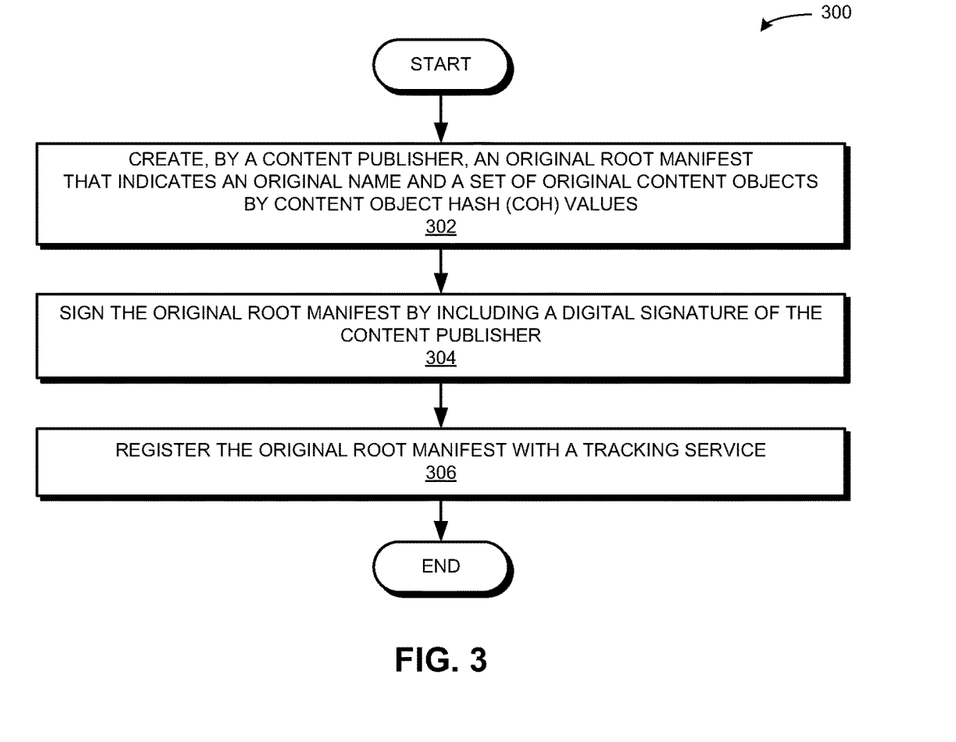
FIG. 3 presents a flow chart illustrating an exemplary method performed by a content publisher for publishing and registering content with a tracking service, in accordance with an embodiment.

FIG. 3 presents a flow chart illustrating an exemplary method 300 performed by a content publisher for publishing and registering content with a tracking service, in accordance with an embodiment. During operation, a content publisher (e.g., a content publishing device or a content producing device) can create an original root manifest that indicates an original name and a set of original content objects by their content object hash (COH) values (operation 302). The publisher can create the content objects indicated by the original root manifest based on a manifest hierarchy (as described in relation to FIG. 2A) by using the methods described in U.S. patent application Ser. No. 14/337,026, herein incorporated by reference. The content publisher can digitally sign the original root manifest (operation 304), e.g., by using a digital certificate of the publisher or based on a private key of the publisher. The content publisher can register the original root manifest with a tracking service (operation 306). The publisher can communicate with the tracking service via any cast routing and can also use an authenticated exchange protocol, e.g., for reliable content exchange of a CCN pipeline exchange, as described in U.S. patent application Ser. No. 14/475,416 and herein incorporated by reference.

Content Consumers and Seeders

Figure 4A:
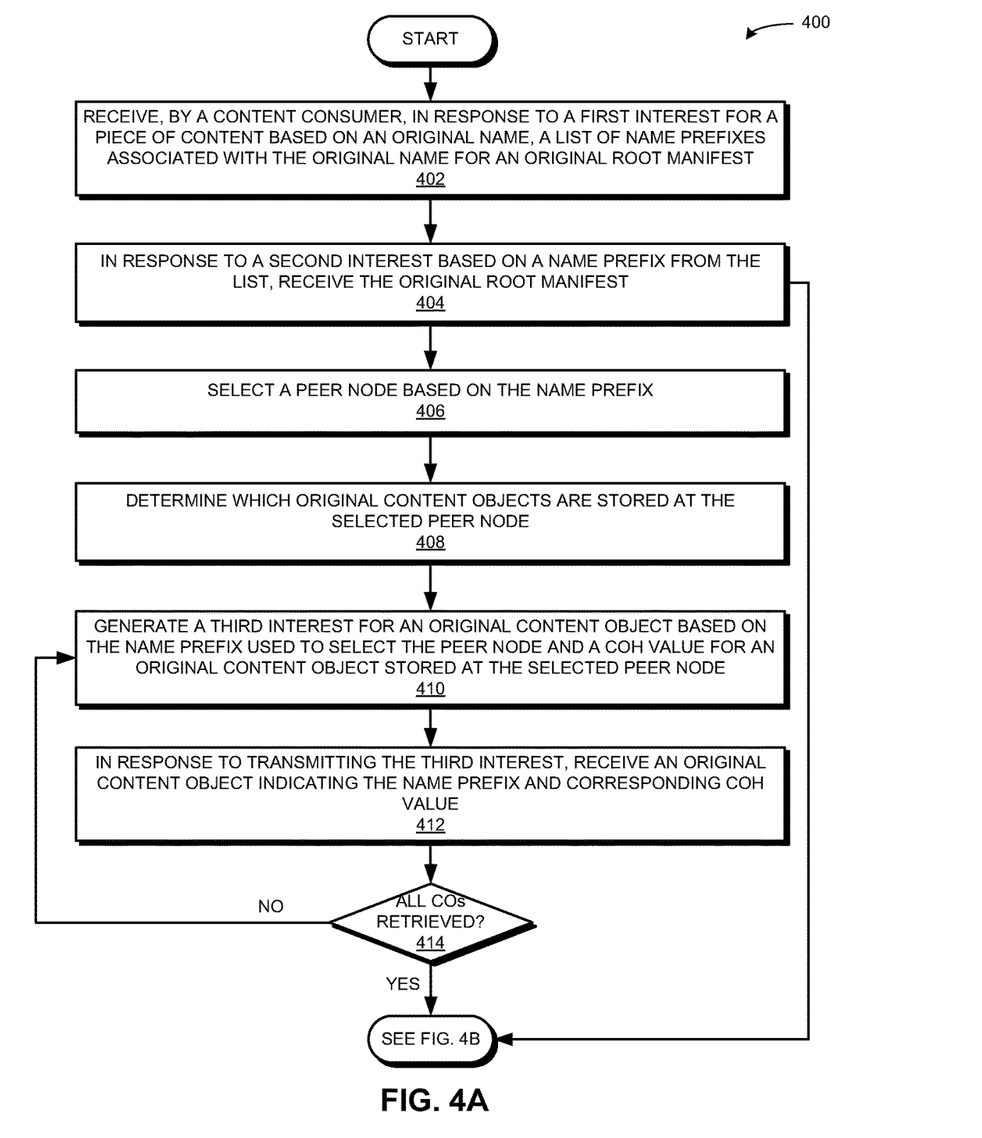
FIG. 4A presents a flow chart illustrating an exemplary method performed by a content consumer for obtaining content that has been registered with a tracking service, in accordance with an embodiment of the present invention.

FIG. 4A presents a flow chart illustrating an exemplary method 400 performed by a content consumer for obtaining content that has been registered with a tracking service, in accordance with an embodiment of the present invention. During operation, a content consumer (e.g., a content consuming device) transmits a first interest for a piece of content based on an original name. The interest can be transmitted to a tracking service. In response to the first interest, the content consumer receives a list of name prefixes associated with the original name which corresponds to an original root manifest (operation 402). The original root manifest, which has been registered with the tracking service, indicates a set of original content objects and includes a set of corresponding content object hash (COH) values. The consumer can select a name prefix from the list and transmit a second interest for the original root manifest. In response to the second interest, the content consumer receives the original root manifest (operation 404). The consumer selects a peer node based on the name prefix (operation 406) and determines which original content objects are stored at the selected peer node (operation 408).

The consumer then generates a third interest for an original content object. The name for the third interest includes the name prefix used to select the peer node and a COH value for an original content object stored at the selected peer node (operation 410). The consumer transmits the third interest to the selected peer node and receives a matching original content object that indicates the name prefix and corresponding COH value (operation 412). If the consumer has retrieved all of the original content objects stored at the selected peer node (decision 414), the operation proceeds as described below in relation to FIG. 4B. If not, the consumer continues to generate interests until all of the original content objects stored at the selected peer node are retrieved (by repeating operations 410 and 412). In addition, the consumer can select multiple peer nodes that store some or all of the original content (as in operation 406), determine which original content objects are stored at each of the selected peer nodes (as in operation 408), and transmit interests to the multiple peer nodes for the original content objects based on a peer's routable name for the content and a corresponding COH value (as in operations 410 and 412). In some embodiments, the consumer can begin the process of becoming a seeder before it has retrieved any original content from a peer node. For example, the consumer can register its new root manifest with the tracking service immediately after obtaining the original root manifest (shown by the flow from operation 404 to FIG. 4B).

Figure 4B:
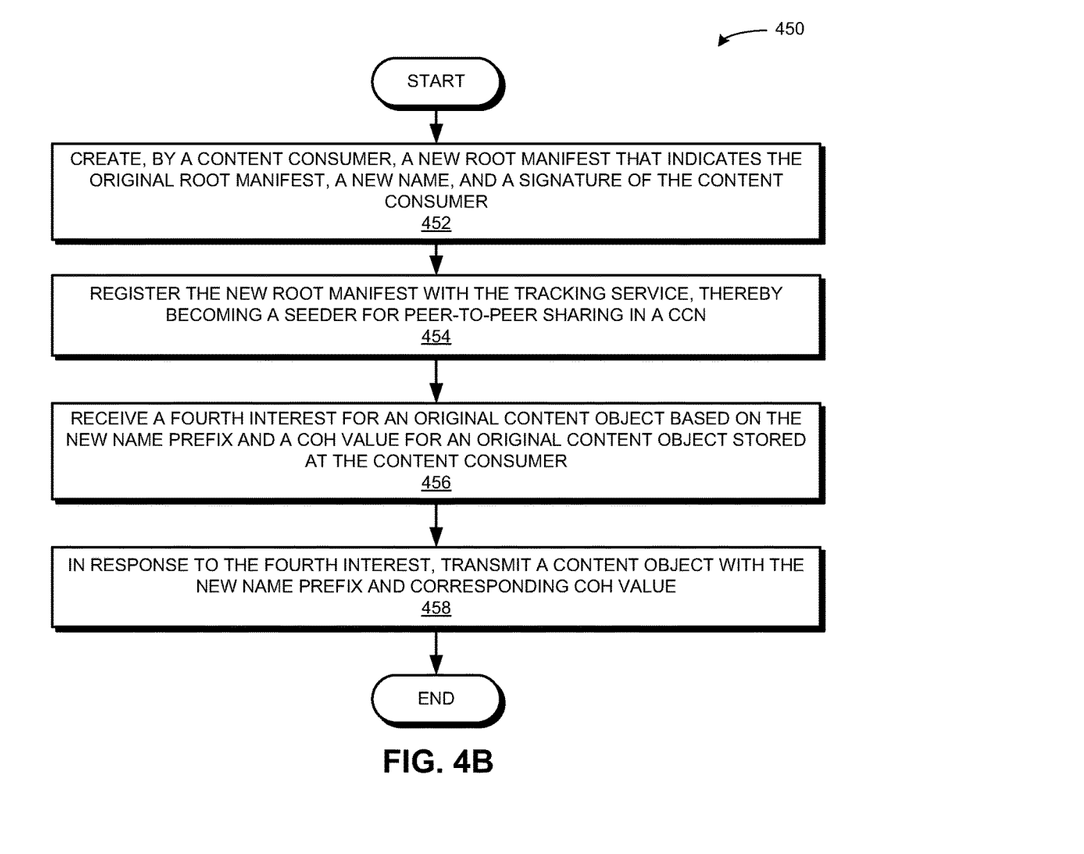
FIG. 4B presents a flow chart illustrating an exemplary method performed by a content consumer for registering content with the tracking service and becoming a seeder for peer-to-peer sharing in a CCN, in accordance with an embodiment of the present invention.

FIG. 4B presents a flow chart illustrating an exemplary method 450 performed by a content consumer for registering content with the tracking service and becoming a seeder for peer-to-peer sharing in CCN, in accordance with an embodiment of the present invention. The content consumer, in possession of the original root manifest, creates a new root manifest with a new name and a signature of the content consumer (operation 452). The new root manifest indicates the original root manifest. In some embodiments, the new root manifest embeds the original root manifest in the payload of the new root manifest (as described in relation to FIG. 2C). The content consumer also signs the new root manifest, based on a digital certificate or a private key of the consumer. The consumer registers the new root manifest with the tracking service (operation 454), which results in the consumer's name prefix being added to the list of name prefixes for the original content maintained by the tracking service. The consumer can communicate with the tracking service via any cast routing and can also use an authenticated exchange protocol, as described in U.S. patent application Ser. No. 14/475,416 and herein incorporated by reference. Thus, the consumer becomes a seeder (e.g., a peer node) that hosts and can share its copy of the original content with other requesting nodes. Subsequently, the consumer, now acting as a seeder, receives a fourth interest for an original content object based on the new name prefix (e.g., the routable name prefix for the consumer) and a corresponding COH value for an original content object stored by the consumer (operation 456). In response to the fourth interest, the consumer transmits a content object with the new name prefix and a matching COH value (operation 458).

In addition, a content hosting device (e.g., a content consumer or seeder) can withdraw its routable name prefix from the list of name prefixes maintained by the tracking service for a specific collection of content objects (e.g., an original root manifest). To do so, the consumer or seeder can sign a request for withdrawal that contains the content object hash of the manifest that it wishes to remove. The original root manifest registered with the tracking service can contain a public key to authenticate the root manifest. To authenticate the original root manifest, a recipient (e.g., the tracking service) can perform a hash on the manifest itself and determine whether the hash matches the KeyId included in the original root manifest. Similarly, to authenticate a withdrawal request, the tracking service can compare the included COH of the manifest for withdrawal with the KeyId to confirm integrity, and verify the signature to confirm authenticity. The tracking service can then stop advertising the requesting consumer's routable prefix for the content, e.g., by removing the consumer's routable prefix from the list of prefixes for the content. Furthermore, a consumer or seeder can withdraw its routable name prefix entirely from the tracking service. A complete withdrawal request results in the tracking service removing the consumer's routable prefix from all lists that contain the consumer's name prefix (e.g., for any previous manifests registered with the tracking service).

Figure 5:
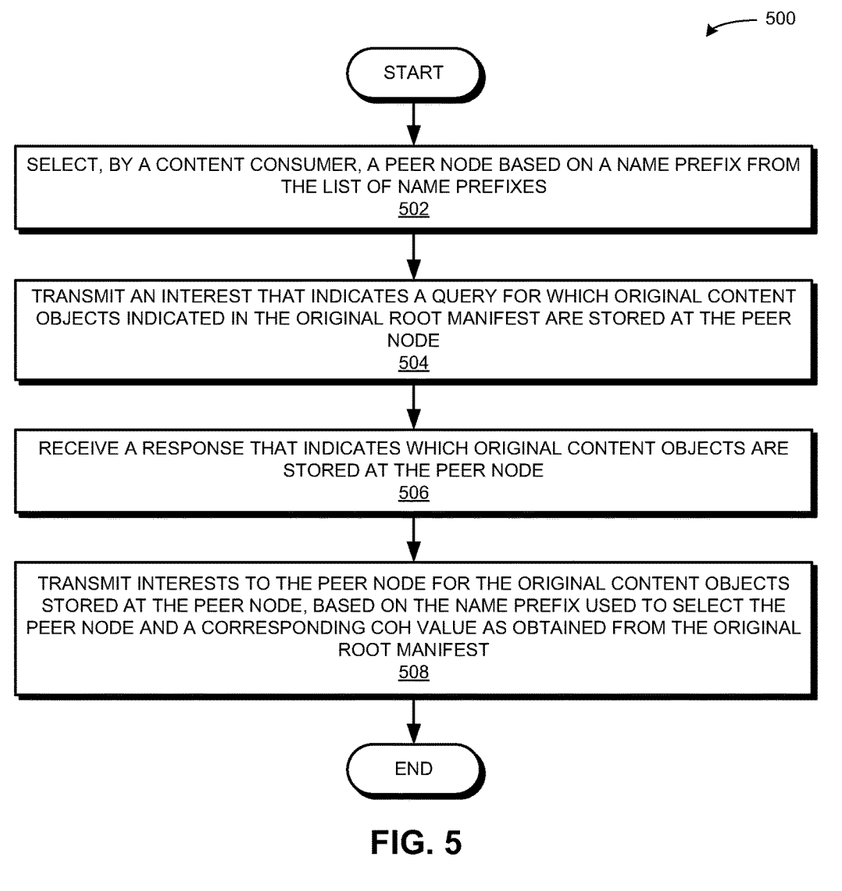
FIG. 5 presents a flow chart illustrating an exemplary method performed by a content consumer for determining which content objects are stored at a peer node, in accordance with an embodiment of the present invention.

FIG. 5 presents a flow chart illustrating an exemplary method 500 by a content consumer for determining which content objects are stored at a peer node, in accordance with an embodiment of the present invention. During operation, a content consumer selects a peer node based on a name prefix (operation 502). The name prefix can be from a list retrieved from and maintained by a tracking service. The name prefix can also be included in a root manifest obtained from the tracking service. The consumer transmits an interest to the selected peer node that indicates a query for which original content objects indicated in the original root manifest are stored at the selected peer node (operation 504). For example, the query can be a request for an index value from the peer node, where the request includes a current index value of a last known peer node. If the current index value of a last known peer node is not known, the request can include a current index value of "0." Based on the request, the consumer receives a response that indicates which original content objects are stored at the peer node (operation 506). The response can indicate a current index value of the selected peer node, where the selected peer node's current index value indicates which original content objects are stored at the selected peer node. For example, the selected peer node's current index value can be the next sequence number that the selected peer node would publish an index under if asked. The index request can of the format "/peer/index/publisherhash/next," where "/peer" is the routable name prefix to the peer node, "index" indicates the request type, "publisherhash" indicates the COH of the original publisher's original root manifest, and "next" indicates the last known peer node's next response (e.g., the last known peer node's response to a "next" query, which is the current index of the last known peer node). In some embodiments, a peer node that responds to an index request (e.g., in response to operation 504) may encode the response as a set of differences by using difference based content networking, as described in U.S. patent application Ser. No. 14/334,509, herein incorporated by reference.

Hence, the content consumer can learn the current contents of a peer node without needing to first obtain any state information. Furthermore, the consumer can continue requesting the next state even when a peer does not yet have all of the original content. The consumer can then transmit interests to the peer node for the original content objects stored at the peer node (operation 508). As discussed above, the consumer can transmit multiple sets of interests to multiple peer nodes that have some or all of the original content objects.

Tracking Service

Figure 6:
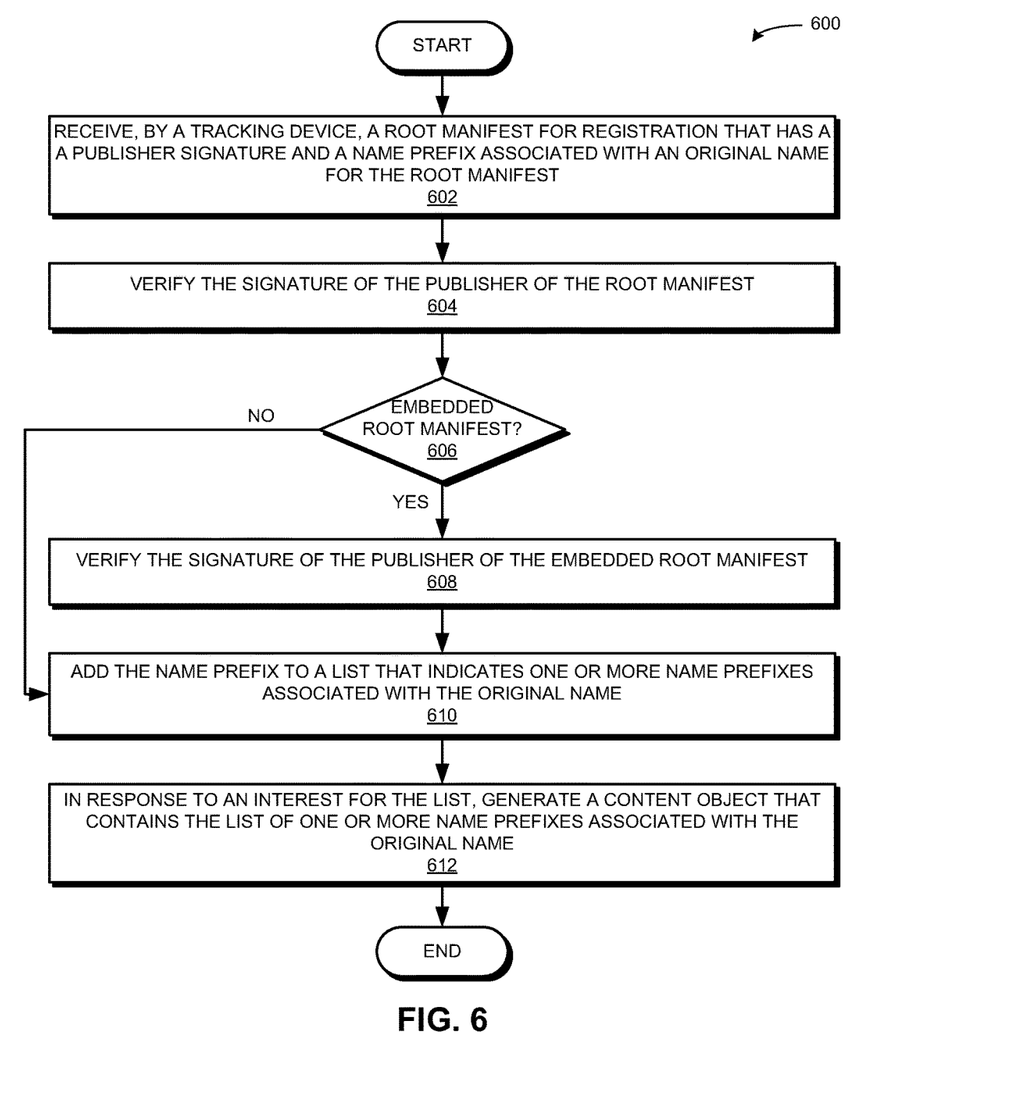
FIG. 6 presents a flow chart illustrating an exemplary method performed by a tracking device for registering content and maintaining a list of name prefixes associated with the registered content, in accordance with an embodiment of the present invention.

FIG. 6 presents a flow chart illustrating an exemplary method 600 performed by a tracking device for registering content and maintaining a list of name prefixes associated with the registered content, in accordance with an embodiment of the present invention. A tracking service can include one or more tracking devices that share a same anycast address. The tracking devices can run a consistency protocol to keep their databases synchronized. Note that all protocol messages that pass between the tracking devices can carry a serial number (or timestamp or other unique identifying indicator) so that all such messages are well-ordered and duplicates may be avoided. During operation, a tracking device receives a root manifest for registration (operation 602). The root manifest has a name prefix associated with an original name, as well as a digital signature of a publisher of the manifest. The tracking service verifies the signature of the publisher (operation 604) and determines if the root manifest further includes an embedded root manifest (decision 606). For example, a root manifest can embed or otherwise indicate another root manifest in its payload (as described in relation to FIG. 2C). If there is an embedded root manifest, the tracking service verifies the signature of the publisher of the embedded root manifest (operation 608), and subsequently adds the name prefix for the root manifest to a list that indicates one or more name prefixes associated with the original name (operation 610).

If there is no embedded root manifest (indicating that the received root manifest is itself an original root manifest for registration), the tracking service adds the name prefix for the original name to the list (operation 610). In response to an interest for the list, the tracking device generates a content object that contains the list of one or more name prefixes associated with the original name (operation 612). In this manner, the tracking device can advertise (or return upon a request for) the list of peer nodes that fulfill a request by a content consumer for some or all of the content objects associated with the original content (e.g., as indicated by their COH values in the original root manifest). In some embodiments, in response to a request for the original content, the tracking device transmits the list of routable name prefixes by including them in an original root manifest object, as described in U.S. patent application Ser. No. 14/337,026, herein incorporated by reference.

The tracking device can also receive a request from a content hosting device (e.g., a content consumer or a seeder) to remove a name prefix from the list. The removal request includes a signature of the content hosting device and a COH value of the manifest to be removed. The tracking device verifies the signature of the content hosting device and further determines that the COH value matches a manifest previously registered with the tracking service. Subsequently, the tracking device removes the name prefix associated with the request from its list of routable name prefixes.

Furthermore, as described above in relation to FIG. 4A, a consumer can register a new root manifest with the tracking service before obtaining any of the content indicated by the new root manifest, thus becoming a partial seeder or a "leecher." The tracking service can support both seeders and leechers, such that a subsequent content consumer can retrieve content from a node that stores all of the original content (e.g., a seeder) or a node that stores only some of the original content (e.g., a leecher).

Exemplary Computer System

Figure 7:
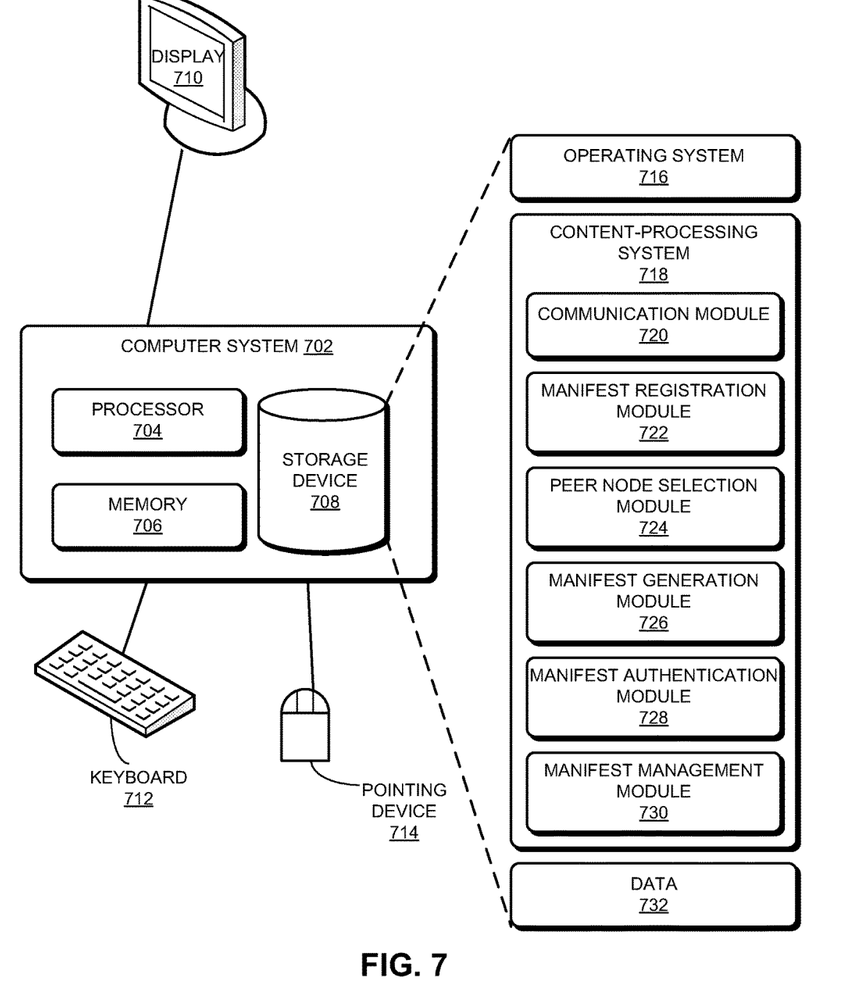
FIG. 7 illustrates an exemplary computer system that facilitates peer-to-peer sharing of content in a CCN, in accordance with an embodiment of the present invention.

FIG. 7 illustrates an exemplary computer system 702 that facilitates peer-to-peer sharing of content in a CCN, in accordance with an embodiment of the present invention. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store operating system 716, a content-processing system 718, and data 728.

Content-processing system 718 can include instructions, which when executed by computer system 702, can cause computer system 702 to perform methods and/or processes described in this disclosure. Specifically, content-processing system 718 may include instructions for disseminating and/or receiving CCN interests and content objects (communication module 720). Further, content-processing system 718 can include instructions for selecting a peer node based on a name prefix and determining which content objects indicated by an original root manifest are stored at the peer node (peer node selection module 724). Content-processing system 718 can include instructions for creating a new root manifest that indicates an original root manifest (manifest generation module 726) and for registering the new root manifest with a tracking service (manifest registration module 722). Content-processing system 718 can include instructions for authenticating a manifest (manifest authentication module 728) and registering a manifest (manifest management module 730). Content-processing system 718 can also include instructions for withdrawing a manifest from registration (manifest management module 730).

Data 732 can include any data that is required as input or that is generated as output by the methods and/or processes described in this disclosure. Specifically, data 732 can store at least: a nameless content object; a hierarchy of manifests for the nameless content objects; an original root manifest indicating a collection of original nameless content objects; content object hash values (COH) for the original content objects; a routable name prefix for an original publisher; a routable name prefix for a content consumer or seeder; a list of one or more routable name prefixes associated with an original name for content; a new root manifest that indicates an original root manifest; a name for a manifest; a signature of a publisher of a manifest; and an index value corresponding to current index of a specific manifest.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    receiving, after transmitting a first interest for content based on a first name, a list of one or more name prefixes, wherein the first name is a hierarchically structured variable length identifier (HSVLI), and the first name corresponds to a first root manifest that includes a plurality of content object hash (COH) values for a plurality of original content objects;
    receiving, after transmitting a second interest based on a first name prefix of the one or more name prefixes, the first root manifest; and
    transmitting a third interest, wherein a name for the third interest includes the first name prefix, and the third interest includes a COH value for an original content object of the plurality of original content objects.

2. The method of claim 1, further comprising:
    creating a second root manifest, wherein the second root manifest indicates the first root manifest and a second name; and
    registering the second root manifest with a tracking service, wherein a second name prefix associated with the second name is added to the list.

3. The method of claim 2, further comprising:
    receiving a fourth interest, wherein a name for the fourth interest includes the second name prefix, and the fourth interest includes the COH value for the original content object.

4. The method of claim 3, further comprising:
    transmitting the original content object.

5. The method of claim 2, wherein the first root manifest includes a first signature of a publisher of the content indicated by the first root manifest, and the second root manifest includes a second signature.

6. The method of claim 5, further comprising: signing the second root manifest with the second signature.

7. The method of claim 1, further comprising:
    generating a request including a first current index value of a last known peer node; and
    receiving, based on the request, a response that indicates a second current index value indicating a plurality of original content objects.

8. A non-transitory, computer-readable storage medium storing instructions that, when executed by a computer, cause the computer to perform a method comprising:
    receiving, after transmitting a first interest for content based on a first name, a list of one or more name prefixes, wherein the first name is a hierarchically structured variable length identifier (HSVLI), and the first name corresponds to a first root manifest that includes a plurality of content object hash (COH) values for a plurality of original content objects;
    receiving, after transmitting a second interest based on a first name prefix of the one or more name prefixes, the first root manifest; and
    transmitting a third interest, wherein a name for the third interest includes the first name prefix, and the third interest includes a COH value for an original content object of the plurality of original content objects.

9. The medium of claim 8, the method further comprising:
    creating a second root manifest, wherein the second root manifest indicates the first root manifest and a second name; and
    registering the second root manifest with a tracking service, wherein a second name prefix associated with the second name is added to the list.

10. The medium of claim 9, the method further comprising:
    receiving a fourth interest, wherein a name for the fourth interest includes the second name prefix, and the fourth interest includes the COH value for the original content object.

11. The medium of claim 10, the method further comprising:
transmitting the original content object.

12. The medium of claim 9, wherein the first root manifest includes a first signature of a publisher of the content indicated by the first root manifest, and the second root manifest includes a second signature.

13. The medium of claim 12, the method further comprising:
signing the second root manifest with the second signature.

14. The medium of claim 8, the method further comprising:
generating a request including a first current index value of a last known peer node; and
receiving, based on the request, a response that indicates a second current index value indicating a plurality of original content objects.

15. A computer system, comprising:
a processor; and
a storage device coupled to the processor and for storing instructions that, when executed by the computer system, cause the computer system to perform a method, the method including
receiving, after transmitting a first interest for content based on a first name, a list of one or more name prefixes, wherein the first name is a hierarchically structured variable length identifier (HSVLI), and the first name corresponds to a first root manifest that includes a plurality of content object hash (COH) values for a plurality of original content objects;
receiving, after transmitting a second interest based on a first name prefix of the one or more name prefixes, the first root manifest; and
transmitting a third interest, wherein a name for the third interest includes the first name prefix, and the third interest includes a COH value for an original content object of the plurality of original content objects.

16. The computer system of claim 15, the method further comprising:
creating a second root manifest, wherein the second root manifest indicates the first root manifest and a second name; and
registering the second root manifest with a tracking service, wherein a second name prefix associated with the second name is added to the list.

17. The computer system of claim 16, the method further comprising:
receiving a fourth interest, wherein a name for the fourth interest includes the second name prefix, and the fourth interest includes the COH value for the original content object.

18. The computer system of claim 17, the method further comprising:
transmitting the original content object.

19. The computer system of claim 16, wherein the first root manifest includes a first signature of a publisher of the content indicated by the first root manifest, and the second root manifest includes a second signature.

20. The computer system of claim 19, the method further comprising:
signing the second root manifest with the second signature.

* * * * *